Patented Sept. 12, 1950

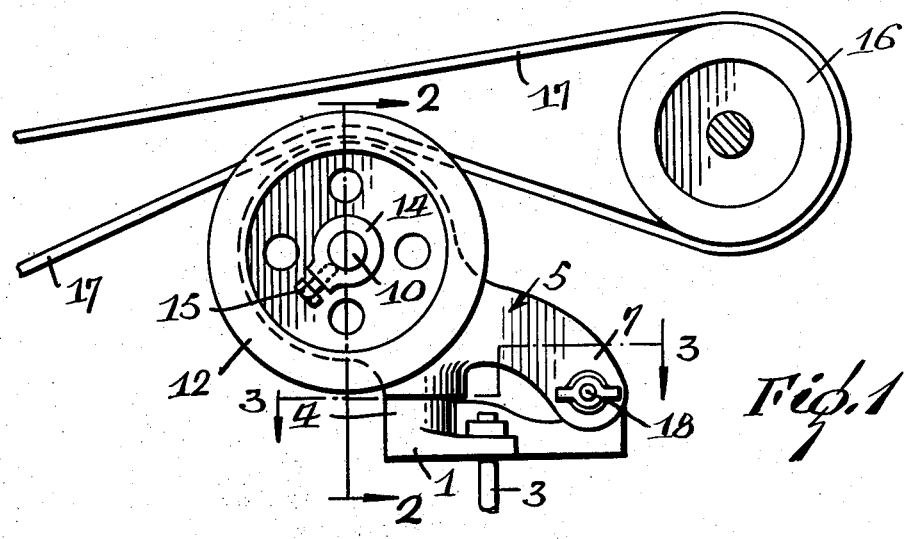
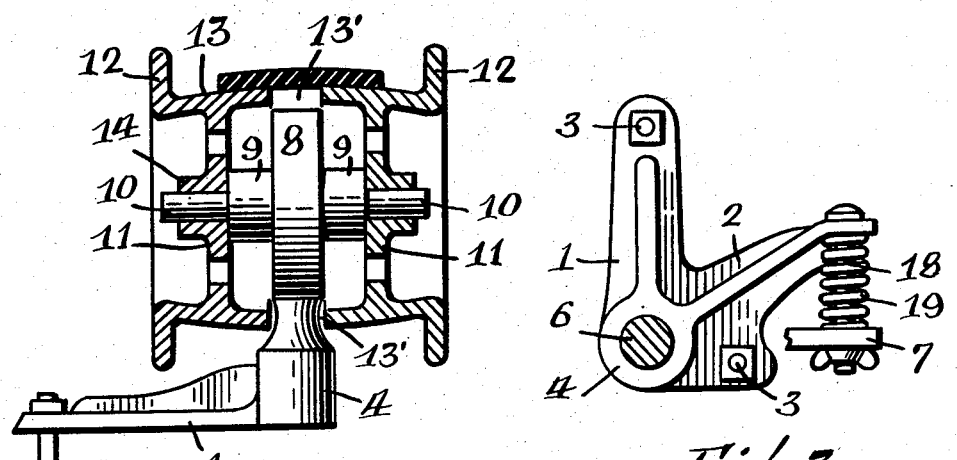

2,522,435

UNITED STATES PATENT OFFICE 2,522,435

BELT GUIDE

Amedee Dion, Ste-Therese de Blainville, Quebec, Canada, assignor to Dion Freres Inc., Ste-Therese de Blainville, Quebec, Canada Application September 20, 1948, Serial No. 50,115

3 Claims. (Cl. 74—240)

1

The present invention pertains to a novel belt guide for threshing and other belt driven machines.

The principal object of the invention is to provide a belt guide that holds the belt taut and from which the belt cannot slip while permitting ample lateral play. Another object is to provide a relatively simple and inexpensive yet rugged device for accomplishing the stated purpose.

In the realization of these objects, the device of the invention includes a pair of coaxial pulleys over which the belt is passed. The pulleys are spaced apart at their inner ends, and the gap thus formed centers the belt. Further, the outer ends of the pulleys are flanged radially to prevent the belt from riding off the pulleys.

The drum surfaces of the pulleys are convex and continuous one with the other. This formation also aids in centering the belt. The support for the pulleys is a pivotally and resiliently mounted bracket that permits ample side play of the pulleys as a unit.

The invention is fully disclosed by way of example in the following description and in the accompanying drawings in which:

Figure 1 is a side elevation of the device;

Figure 2 is a section on the line 2—2 of Figure 1; and

Figure 3 is a plan section on line 3—3 of Figure 1.

Reference to these views will now be made by use of like characters which are employed to designate corresponding parts throughout.

In the several figures is shown a base 1 of substantially V-shape and including a laterally extending arm 2. The base is fastened to the frame of the threshing machine by bolts 3. The base is formed with a vertical boss or bearing 4 for a purpose that will presently be described.

On the base is mounted a bracket 5 which includes a journal 6 received in the bearing 4 and a laterally extending arm 7. The body of the bracket is a circular disk 8 lying vertically having spacers 9 at both sides and trunnions 10 extending horizontally from the spacers.

On each trunnion is journalled a pulley 11 having a radial flange 12 at its outer edge and having a convex drum or contact surface 13. The surfaces 13 of both pulleys are spaced apart at 13' and form a continuous convex surface with each other. The hub 14 of each pulley is fastened to its trunnion 10 by a set screw 15, in which case the trunnions are rotatably mounted in the spacers 9.

2

The drive pulley 16 of the threshing machine is driven by a belt 17 which in turn is driven by any suitable means such as a motor. The belt is engaged by the pulleys 11 which serve as a belt guide. The arms 2 and 7 are joined by a slidable bolt 18 surrounded by a coil spring 19 to permit lateral play of the bracket 5 and the pulleys about the axis of the journal 6.

In the operation of the device, the belt is centered by the gap 13' and is prevented by the flanges 12 from slipping off the pulleys.

Although a specific embodiment of the invention has been illustrated and described, it will be understood that various alterations in the details of construction may be made without departing from the scope of the invention as indicated by the appended claims.

What I claim as my invention is:

1. A belt guide comprising a fixed base having a radial arm, a bracket pivotally mounted on said base and having a lateral arm, a resilient connection between said arms, a pair of pulleys rotatably supported coaxially by said bracket, the surfaces of the respective pulleys being spaced apart.

2. A belt guide comprising a fixed base having a radial arm, a bracket pivotally mounted on said base and having a lateral arm, a bolt passed slidably through said arms, a spring on said bolt and engaging both arms, a pair of pulleys rotatably supported coaxially by said bracket, said pulleys being spaced apart.

3. A belt guide comprising a fixed base having a radial arm, a bracket pivotally mounted on said base and having a lateral arm, a bolt passed slidably through said arms, a spring on said bolt and engaging both arms, a pair of pulleys rotatably supported coaxially by said bracket, and a nut on said bolt and engaging the outer surface of one of said arms, the surfaces of the respective pulleys being spaced apart.

AMEDEE DION.

REFERENCES CITED

The following references are of record in the file of this patent:

UNITED STATES PATENTS

| Number | Name | Date |
| --- | --- | --- |
| 481,486 | Garbutt | Aug. 23, 1892 |
| 677,333 | Bartholomew | July 2, 1901 |
| 1,291,368 | Bass | Jan. 14, 1919 |